United States Patent [19]

Durham

[11] Patent Number: 4,758,205
[45] Date of Patent: Jul. 19, 1988

[54] DERAILLEUR MECHANISM FOR BICYCLES

[76] Inventor: Roger O. Durham, 1370 Thompson Ave., Glendale, Calif. 91201

[21] Appl. No.: 910,374

[22] Filed: Sep. 22, 1986

[51] Int. Cl.⁴ .............................................. F16H 9/06
[52] U.S. Cl. ..................................................... 474/80
[58] Field of Search ...................... 474/80, 78, 82, 113, 474/115, 116, 117

[56] References Cited

U.S. PATENT DOCUMENTS

| | | | |
|---|---|---|---|
| 2,099,477 | 1/1937 | Gruyer | 474/80 |
| 2,431,513 | 11/1947 | Schwinn | 474/80 |
| 3,803,933 | 4/1974 | Huret et al. | 474/82 |

FOREIGN PATENT DOCUMENTS

| | | | |
|---|---|---|---|
| 0830162 | 2/1938 | France | 474/80 |
| 0827046 | 4/1938 | France | 474/80 |
| 1271896 | 8/1961 | France | 474/82 |
| 1319997 | 1/1963 | France | 474/82 |
| 0431273 | 2/1948 | Italy | 474/80 |

*Primary Examiner*—Stephen J. Novosad
*Assistant Examiner*—Thuy M. Bui

[57] ABSTRACT

A pantograph guide pulley mechanism directs a bicycle chain onto a selected rear sprocket. A floating take-up pulley is linked to a resilient rod to provide chain tension and to take up and play out chain as required.

14 Claims, 1 Drawing Sheet

DERAILLEUR MECHANISM FOR BICYCLES

BACKGROUND OF THE INVENTION

This invention pertains to derailleur shift mechanisms for chain-driven bicycles having one or more front chainrings secured to a crank driven by pedals, and wherein several rear sprockets are coaxially mounted on the rear wheel. Such derailleur mechanisms guide the chain onto one or another of the rear sprockets, keep tension on the chain to prevent its derailment, and take up and play out chain as required.

Current derailleur mechanisms have swinging arm tensioning and take-up devices and pantograph linkages to allow lateral adjustment of a guide pulley by the cyclist.

A pantograph support member is bolted to the bicycle frame. Two parallel pantograph arms are pivotally supported on the pantograph support member. At their other ends, the two pantograph arms in turn pivotally support a pantograph head member. A guide pulley is rotatably supported on the head member. A spring-biased swinging arm is pivotally supported also on the head member. A take-up pulley is rotatably mounted on the swinging arm. A control cable shifts the head member laterally, causing the guide pulley to line up with one or another of the rear sprockets, thus causing the chain to engage the desired rear sprocket.

Over a period of time, the swinging arm take-up mechanism has reached the limit of its capacity. Larger sprocket differences have required the take-up to be able to take up and play out more chain. Swinging arms have become longer, heavier, and perforce more subject to inertia. When a bicycle hits a bump, the weight of the swinging arm may cause tension in the chain to be momentarily relaxed, occasionally resulting in chain deraillment.

Longer swinging arms have reduced ground clearance. Current swinging arms preclude the use of wide-ratio gearing with 24" wheels to some extent; they preclude the use of such gearing almost entirely with 20" wheels.

More front chainrings and more rear sprockets have increased the misalignment of the chain, resulting in misalignment of the take-up pulley, which remains in the same lateral plane as the guide pulley.

Existing derailleur mechanism are complex mechanically, difficult to service, and make wheel removal unduly difficult. If a torsion spring of the swinging arm breaks, more often than not, the entire unit is replaced. Such derailleur mechanism are too complex to be used to any extent anywhere but in Europe, Japan, and the United States. Other parts of the world use internally geared 3 and 5 speed hubs, which, while being complicated in their own right, at least are very reliable.

What's needed is a derailleur mechanism which will:
1. take up and play out large amounts of chain.
2. accomodate much chain misalignment.
3. provide uniform chain tension and prevent chain deraillment.
4. Provide increased ground clearance.
5. Be simple to make, mount, service, and understand.

And that's what the derailleur mechanism of the current invention provides.

SUMMARY OF THE INVENTION

According to the invention, the take-up pulley is removed from the derailleur mechanism entirely. There is no swinging arm. The take-up pulley is mounted on a metal bale which is secured by a cord to the end of a resilient fiberglass rod, which is in turn secured to the frame. The take-up pulley floats in mid air, being influenced only by the chain, by the cord and the resilient rod, and by gravity. The pantograph head member now rotatably supports only the guide pulley, making it a much simpler unit. Pulleys having flanges on both sides of the chain are used, which provides much better chain guidance and reduces chain derailment. There are several other advantages:

1. The take-up pulley and its bale can be very light, allowing them to respond very quickly to slackness in the chain. Chain tension, and the friction resulting from chain tension, can be reduced, without danger of chain derailment.

2. The take-up pulley, when viewed from above, will be seen to align itself approximately midway between the guide pulley and the front chainring, thus minimizing the ill effects of chain misalignment. The tip of the resilient rod moves laterally in accomodation.

3. When viewed from the rear, the take-up pulley will be seen to swivel on its cord, allowing the chain to accomodate the mis-alignment between the guide pulley and the chainring by twisting. This is something entirely new; no swinging arm mechanism has ever been able to allow this kind of compliance by the chain.

4. The take-up pulley can be arranged to stay slightly below the level of the guide pulley, and thus can provide more ground clearance. Sufficient clearance for 24 or 20 inch wheels can be provided, even with large rear sprockets.

5. Because of the more-flexible mounting, the chain makes less noise and has noticeably less friction.

6. Shifting is more accurate, in part, because the chain always wraps half-way around the guide pulley, and also in part, because the guide pulley usually has two side flanges which better guide the chain.

7. The floating take-up pulley mechanism is simpler. All it consists of is a resilient rod, a strap or cord, a bale, and a rotatable guide pulley mounted on the bale, with two simple supports to secure the resilient rod to the frame. When changing a wheel, the entire take-up pulley mechanism can be unhooked and taken off the bicycle.

Without the swinging arm device, the pantograph guide pulley mechanism is much simplified.

The derailleur mechanism of the current invention is the first significant improvement since their invention 60 or more years ago.

DETAILED DESCRIPTION OF THE DRAWINGS

Figure 1:
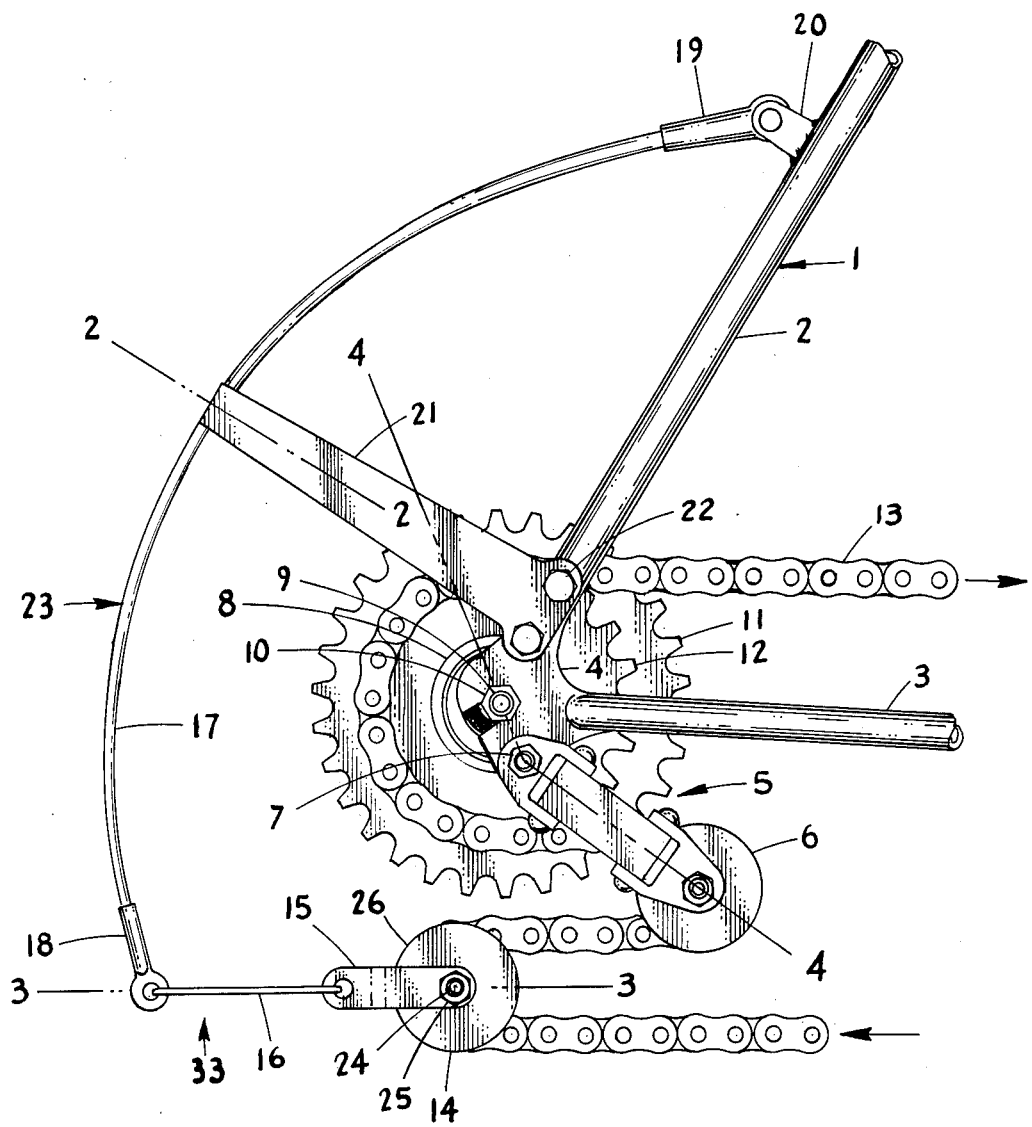
FIG. 1 shows the right side of the rear part of a bicycle frame, showing a derailleur mechanism according to the invention in side view.

Referring to FIG. 1, a portion of a bicycle frame 1 includes a tubular upper stay 2 and a tubular lower stay 3, both joined to a slotted dropout plate 4. A pantograph guide pulley means 5 includes a rotatably-supported, laterally-shiftable guide pulley 6 having two side flanges which guide a roller chain 13 between its flanges. A bolt 7 secures said pantograph guide pulley means 5 to said dropout plate 4.

Figure 4:
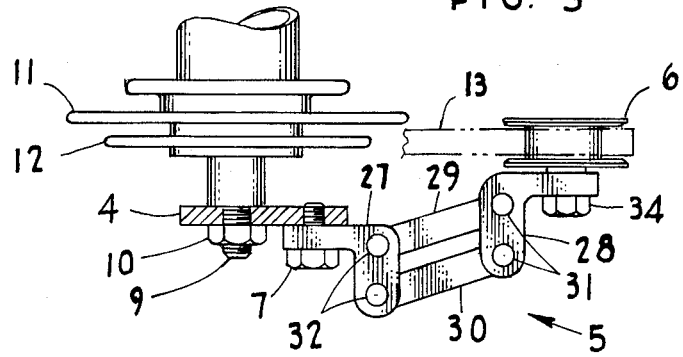
FIG. 4 is a section taken along line 4—4 of FIG. 1. A side view of the pantograph guide pulley means is shown.

In FIG. 4, said guide pulley 6 is shown to be rotatably secured to a head member 28 of said pantograph guide pulley means 5 by a bolt 34. A pair of pantograph arms 29 and 30 are pivotally supported on said head member 28 by two pins 31. Similarly, another pair of pins 32 pivotally support said pantograph arms 29 and 30 on a pantograph support member 27. Said pantograph support member 27 is bolted to said dropout plate 4 of said bicycle frame 1 by said bolt 7.

The pantograph guide pulley means 5 also would have a spring arrangement within it which would bias the pantograph head member 28 in a direction to the right of the bicycle; tending to move it away from the spokes of the wheel.

Such pantograph guide pulley means 5 are also fitted with stop screws, which can be adjusted to limit the excursion of said pantograph head member 28, thus preventing overshifting of the chain. Also, the pantograph guide pulley means 5 would be adapted to receive a control cable, which would allow the head member 28 to be shifted laterally by the cyclist.

A sprocket freewheel mechanism 8 is rotatably supported on an axle 9, which is secured to said dropout plate 4 by a nut 10. A large rear sprocket 11 and a small rear sprocket 12 are thus coaxially mounted, spaced apart from each other, on a rear wheel secured to said bicycle frame 1.

Said upper stay 2 mounts a support 20 adapted for anchoring an end fitting 19 of a resilient bias means 23, which also includes a resilient rod 17 and another end fitting 18 secured to its opposite end. An intermediate support 21 engages said rod 17 between its ends. A pair of bolts 22 secure said intermediate support 21 to said upper stay 2 of said bicycle frame 1.

A rotatable take-up pulley 14, which is secured to said resilient bias means 23 comprise a floating take-up pulley means 33.

Said rotatable take-up pulley 14 is rotatably mounted to a bale 15 by a bolt 24 and a nut 25. A strap or cord 16 links said bale 15 to said end fitting 18. Said take-up pulley 14 has spaced-apart side guide flanges 26, adapted for guiding said roller chain 13.

Figure 2:
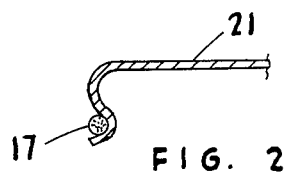
FIG. 2 is a section taken along line 2—2 of FIG. 1, showing a resilient rod to be nested in a support secured to the frame.

In FIG. 2, the resilient rod 17 is shown to be positioned in and supported by a depression in said intermediate support 21.

Figure 3:
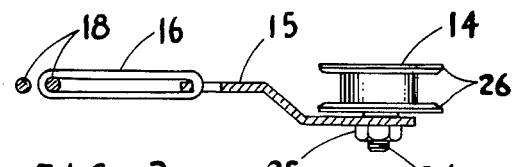
FIG. 3 shows a section looking down on the floating take-up pulley means, with its bale, strap or cord, and shows an eyelet on the end of the resilient rod.

In FIG. 3, the end fitting 18, said strap 16, and said bale 15, said take-up pulley 14, said bolt 24, and said nut 25 are shown in section looking down.

MODE OF OPERATION

Said chain 13 approaches the rotatable take-up pulley 14 in a direction indicated; forms a 'U' about it; proceeds to the guide pulley 6; forms a 'U' about it, then engages one of the rear sprockets 11 or 12. It is shown engaging the smaller rear sprocket 12. After it leaves said sprocket 12, the chain proceeds forward to be driven by a chainring which is secured to a bicycle crank having pedals, in the usual manner for bicycles.

A control cable (not shown) engaging said pantograph guide pulley means 5, is adapted for laterally shifting said guide pulley 6, so as to align it with either of said rear sprockets 11 or 12. When said guide pulley 6 is shifted to line up with said large rear sprocket 11, the chain hops from sprocket 12 to sprocket 11, which requires more chain, and take-up pulley 14 is drawn to the right. The spring action of the resilient rod 17 maintains tension in the roller chain 13.

The resilient bias means 23 is arranged so the chain run between said guide pulley 6 and said take-up pulley 14 is approximately horizontal, which keeps the chain 13 as high above the ground as possible. Also, it is desireable for said take-up pulley 14 to move more or less horizontally as it takes up and plays out chain. Arranged thus, said pulley 14 moves 1" while taking up or playing out 2" of said chain 13. Tension in the lower run of the chain 13 will always be half of that in said strap or cord 16. Said strap or cord 16 can be shortened, if more chain tension is needed. The result is a more uniform chain tension than can be provided by a swinging arm take-up mechanism. Also said strap or cord 16 twists on its axis, allowing said take-up pulley 14 to swivel as it complies with the requirements of said guide pulley 6, and the requirements of the oncoming chain 13. Compliance in this manner cannot be provided by swinging arm tensioners.

Where the floating take-up pulley means 33 shows the resilient bias means to be a resilient rod 17, any number of different bias devices could be used, and are anticipated. For example, a coiled strip spring, called a 'negator' constant force spring, could replace the resilient rod 17. Other manner of coil, compression, tension, torsion, or leaf springs could be used, with appropriate fittings, to accomplish the same result.

Where the resilient rod 17 is shown to be mounted to the frame in two places, it could be easily mounted in only one place, or it could be mounted to the pantograph support member 27.

Where the bale is shown to be secured to the end of the resilient rod by a short strap or cord, the strap or cord and said bale 5 could be eliminated, and the take-up pulley could be mounted directly to an end fitting on the resilient bias means, provided provision for the desirable swivelling of the take-up pulley were made.

The derailleur mechanism of the invention, although it is composed of two separate devices, provides the same functions as does the usual swinging arm pantograph derailleur mechanism. It guides the chain onto the desired rear sprocket. It takes up and plays out chain as needed. It maintains chain tension.

The essence of the invention is the free-floating take-up pulley, without any siwnging arm, being pulled by a resilient bias means so as to maintain tension in the chain as it is taken in or played out. This also results in a new and simplified pantograph guide pulley means having fewer parts and being less expensive to make.

Where both the guide and take-up pulleys are shown to have two spaced apart guide flanges which guide the roller chain between them, conventional pulleys having a single central guide flange could be used, particularly if provision for keeping the chain from coming off were made. Such provision could include fixed metal guides at the guide pulley, or possibly a two-sided bale at the take-up pulley. However, the pulleys with two spaced apart flanges, as shown retain the chain remarkably well and guide it onto the rear sprocket with absolute certainty.

I claim:

1. In a bicycle having a frame, a roller chain, a rear wheel rotatably secured to said frame, said rear wheel coaxially mounting at least two spaced apart rear sprockets adapted for being driven by said roller chain, a derailleur mechanism comprising;
   (a) a pantograph guide pulley means secured to said bicycle frame, said pantograph guide pulley means including a laterally adjustable, rotatable guide pulley adapted for guiding said roller chain onto one or another of said rear sprockets;
   (b) a floating take-up pulley means comprising a rotatable take-up pulley adapted for guiding said roller chain, and a resilient bias means secured to said rotatable take-up pulley, said resilient bias means secured to said bicycle, said take-up pulley supported only by said roller chain and by said resilient bias means.

2. Apparatus according to claim 1, wherein said resilient bias means is a resilient rod.

3. Apparatus according to claim 1, wherein said rotatable take-up pulley is rotatably mounted on a bale, and said bale is linked to said resilient bias means by a strap or cord.

4. Apparatus according to claim 1, wherein said rotatable guide pulley has spaced apart flanges adapted for guiding said roller chain between them.

5. Apparatus according to claim 1, wherein said take-up pulley has two spaced apart guide flanges adapted for guiding said roller chain between them.

6. In a bicycle having a frame, a roller chain, a rear wheel rotatably secured to said bicycle frame, said rear wheel coaxially mounting at least two spaced-apart rear sprockets adapted for being driven by said roller chain, said bicycle frame mounting a laterally-adjustable, rotatable guide pulley means, a floating take-up pulley means adapted for tensioning said roller chain and adapted for taking up and playing out said chain as required, said floating take-up pulley means comprising;
   (a) a rotatable take up pulley adapted for engaging said roller chain;
   (b) a resilient bias means secured to said rotatable take-up pulley, said resilient bias means secured to said bicycle, said take-up pulley supported only by said roller chain and by said resilient bias means.

7. Apparatus according to claim 6, wherein said rotatable take-up pulley is rotatably mounted on a bale, and said bale is linked to said resilient bias means by a strap or cord.

8. Apparatus according to claim 6, wherein said rotatable take-up pulley has spaced apart flanges adapted for guiding said roller chain between them.

9. In a bicycle having a frame, a roller chain, a rear wheel rotatably secured to said bicycle frame, said rear wheel coaxially mounting at least two spaced apart rear sprockets adapted for being driven by said roller chain, said bicycle frame mounting also a floating take-up pulley means, said floating take-up pulley means comprising a floating take up pulley which is secured to a resilient bias means, said floating take-up pulley supported only by said roller chain and by said resilient bias means, said floating take-up pulley means adapted for engaging said roller chain and adapted for tensioning and taking up and playing out roller chain, a pantograph guide pulley means secured to said bicycle frame, said pantograph guide pulley means mounting a laterally-adjustable, rotating guide pulley adapted for guiding said chain onto one or another of said rear sprockets.

10. Apparatus according to claim 9, wherein said pantograph guide pulley means comprises;
    (a) a rotatable guide pulley rotatably supported on a pantograph head member;
    (b) a pantograph support member secured to said bicycle frame;
    (c) a pair of spaced-apart pantograph arms, the ends of each of said pantograph arms pivotally supported at said pantograph support member and at said pantograph head member;
    (d) adjustable stop means adapted for stopping the lateral excursion of said head member;
    (e) control cable mounting means adapted for adjusting the positon of said pantograph head member, whereby said guide pulley may be aligned with one or another of said rear sprockets.

11. Apparatus according to claim 9, wherein said rotatable guide pulley has spaced apart flanges adapted for guiding said roller chain between them.

12. Apparatus according to claim 6, wherein said resilient bias means is a resilient rod.

13. For use on bicycles having a roller chain drive, a chain take-up and tensioning device comprising;
    (a) a resilient rod secured to the frame of the bicycle;
    (b) a bale means for supporting a rotatable take-up pulley, said take up pulley adapted for engaging said roller chain, said take-up pulley supported only by said roller chain and by said bale means;
    (c) means for linking said bale to said resilient rod.

14. Apparatus according to claim 13, wherein said means for linking said bale to said resilient rod is a strap or cord.

* * * * *